United States Patent [19]

Freedman

[11] Patent Number: 4,805,520
[45] Date of Patent: Feb. 21, 1989

[54] VEHICLE DEODORIZER

[76] Inventor: Carl R. Freedman, P.O. Box 237, Charlton, Mass. 01507

[21] Appl. No.: 142,540

[22] Filed: Jan. 11, 1988

[51] Int. Cl.[4] .............................................. B60H 3/00
[52] U.S. Cl. ..................................... 98/2.11; 98/2.16; 422/124
[58] Field of Search ...................... 98/2.07, 2.11, 2.16; 422/123, 124

[56] References Cited

U.S. PATENT DOCUMENTS

| | | | |
|---|---|---|---|
| 2,640,409 | 6/1953 | Hans | 98/10 |
| 2,686,944 | 8/1954 | Gubelin | 422/124 |
| 3,044,276 | 7/1962 | Kauten | 62/311 |
| 3,055,066 | 9/1962 | Duncan | 422/116 |
| 3,259,050 | 7/1966 | Grimm | 98/2.11 |
| 3,993,444 | 11/1976 | Brown | 422/116 |
| 4,309,382 | 1/1982 | Miller | 98/2.11 X |
| 4,352,321 | 10/1982 | Fukui et al. | 98/2.11 |
| 4,677,902 | 7/1987 | Takemasa | 98/2.11 |

FOREIGN PATENT DOCUMENTS 118520  7/1984  United Kingdom ................. 98/2.11

*Primary Examiner*—Harold Joyce
*Attorney, Agent, or Firm*—Blodgett & Blodgett

[57] ABSTRACT

Vehicle deodorizer system having a venting system which directs outside air into the cab of the vehicle, a reservoir of deodorizing fluid, an atomizing nozzle for directing a fine spray of fluid just outside of the venting system, and means for pumping deodorizing fluid from the reservoir to the atomizing nozzle.

4 Claims, 2 Drawing Sheets

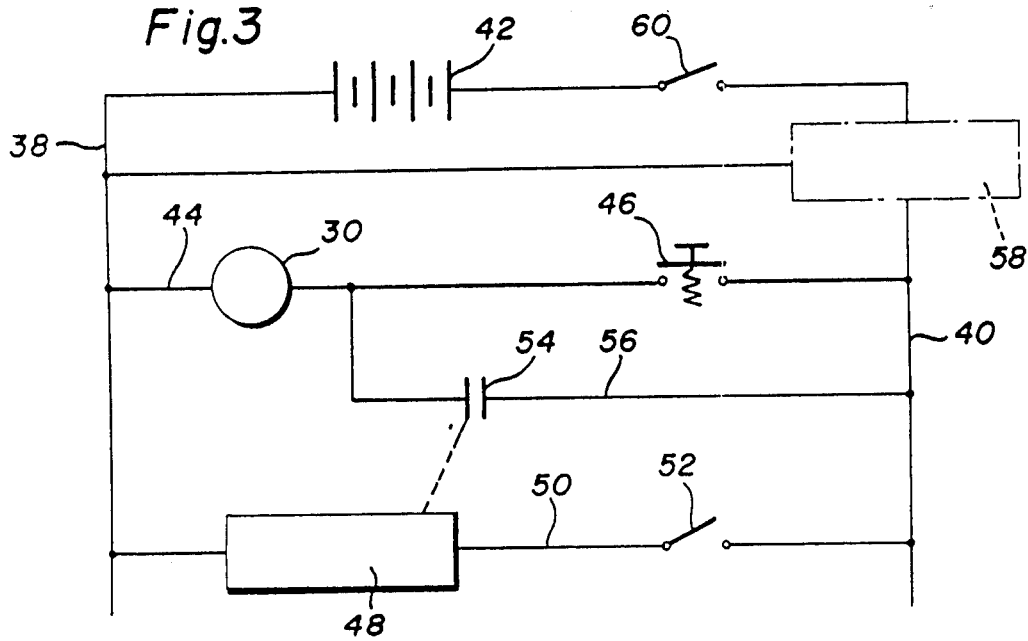
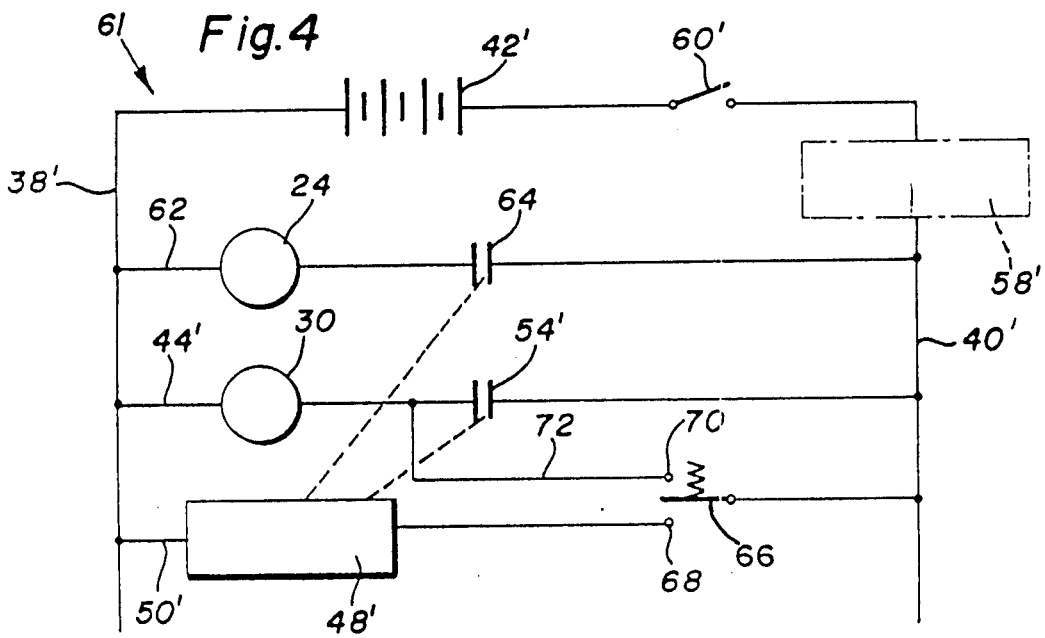

VEHICLE DEODORIZER

BACKGROUND OF THE INVENTION

The present invention relates generally to a deodorizing system for vehicles and, in particular, for deodorizing the air being brought in from the outside of the vehicle.

One of the greatest annoyances to drivers and occupants of motor vehicles is the many objectionable odors particularly acute in metropolitan or highly industrialized encountered during the course of driving. This problem is areas, due to the high level of noxious fumes from automobile exhaust and industrial effluent. Despite all efforts to control air pollution, the problem of objectionable odors in the air has not diminished. In many cases, a device that is used to reduce air pollution very often produces a discharge that is theoretically less toxic, but smells worse. The catalytic converter and the diesel engine are two examples of such devices whose numbers have increased dramatically in recent years.

Objectionable odors are also encountered in the countryside. Many people find certain farm odors objectionable. Occasionally, a dead skunk may also be encountered in the road. Although the skunk is passed over briefly, the odor lingers on for a mile or more.

Most modern vehicles have ventilation systems. However, in most ventilation systems air is brought into the vehicle from the outside. This also brings in the odors which happen to be in the air being driven through. None of the prior art ventilation systems treat the air Immediately before being brought into the vehicle. This and other difficulties experienced with the prior art devices have been obviated by the present invention.

It is, therefore, an outstanding object of the invention to provide a system for deodorizing the air immediately before being brought into a vehicle.

A further object of the present invention is the provision of a venting system that draws air into the vehicle from the outside and adds a deodorizer to the air before it enters the vehicle.

A further object of the present invention is the provision of a deodorizing system which is easily adapted to existing venting systems.

It is another object of the instant invention to provide a deodorizing system which is easily actuated from within the vehicle.

A still further object of the invention is the provision of a deodorizing system that is automatically actuated.

It is a further object of the invention to provide a deodorizing system which is simple in construction, which is inexpensive to manufacture, which is easy to install, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a vehicle deodorizer system comprising a venting system which draws air into the vehicle from the outside, a reservoir containing a liquid deodorant, an atomizing nozzle connected outside of the venting system, and means for pumping the deodorizing fluid from the reservoir to the atomizing nozzle. The venting system consists of an air duct having an inlet opening to the outside of the vehicle, an outlet opening within the vehicle, with or without fan, for creating air flow from the inlet opening to the outlet opening.

More specifically, the means for pumping deodorizing fluid from the reservoir to the atomizing nozzle consists of an electrical pump, a source of electrical power, and electrical control means including a manually-operated switch located within the vehicle.

BRIEF DESCRIPTION OF THE DRAWINGS

The character of the invention, however, may be best understood by reference to one of its structural forms, as illustrated by the accompanying drawings, in which:

FIG. 3 is a schematic view of the electrical control circuitry for the deodorizer, and FIG. 4 is a schematic view of a modified electrical control circuitry of a deodorizer.

DESCRIPTION OF THE PREFERRED EMBODIMENT

Figure 1:
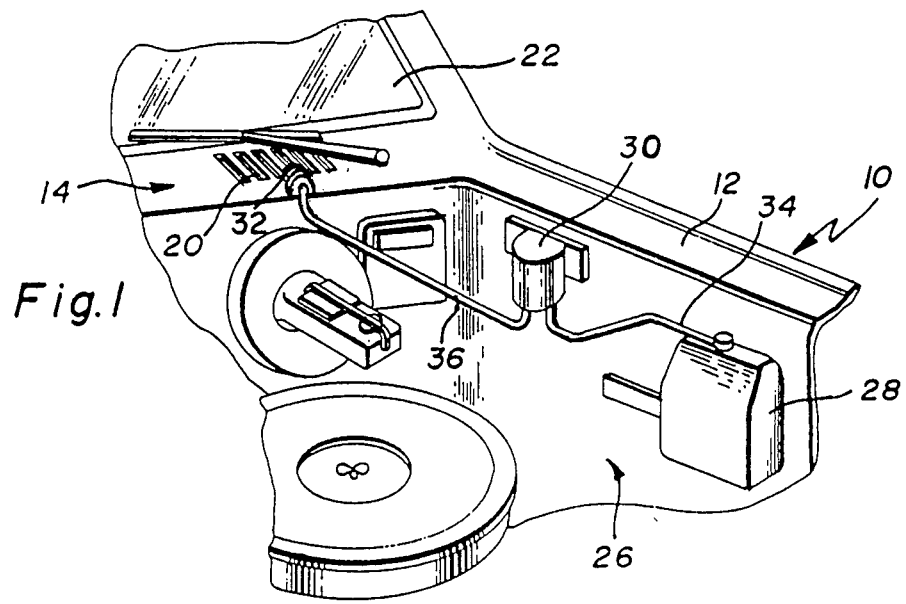
FIG. 1 is a fragmentary perspective view of a vehicle deodorizer embodying the principles of the present invention.
Figure 2:
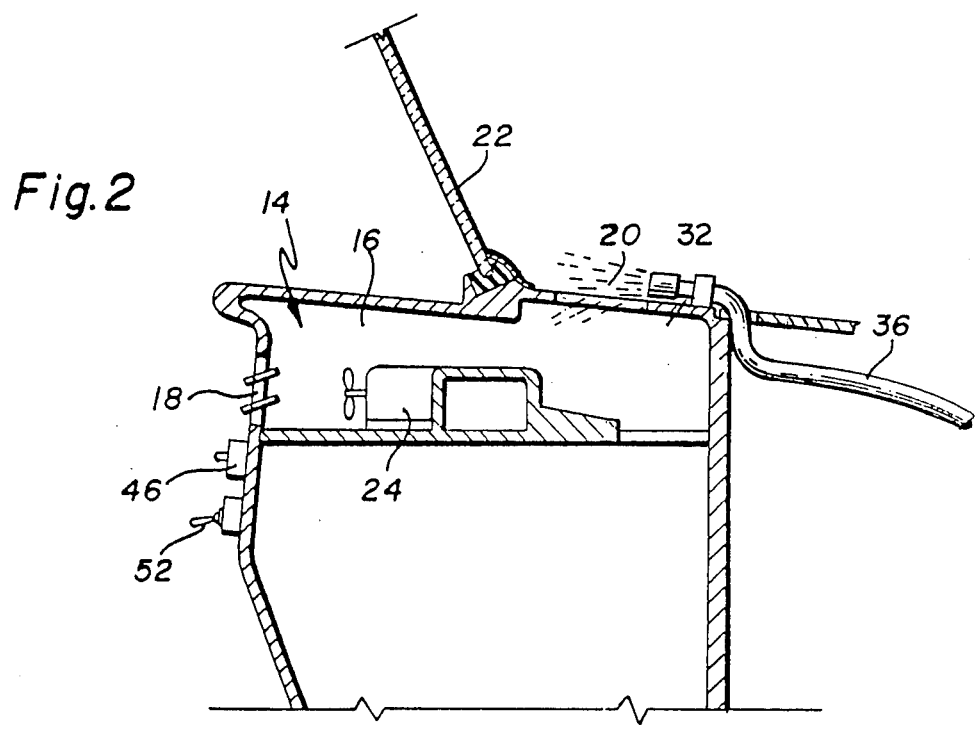
FIG. 2 is a fragmentary cross-sectional view of the vehicle showing the deodorizer in use.

Referring first to FIGS. 1 and 2, which best show the general features of the invention, the vehicle deodorizer, indicated generally by the reference numeral 10, is shown applied to an automobile 12.

The automobile 12 is provided with a venting system, generally indicated by the reference numeral 14, which consists of an air duct 16. The duct has one or more outlet openings 18 within the cab of the automobile and has a plurality of inlet openings 20 located just beneath the windshield 22 of the automobile. As the automobile is driven, air is drawn into air duct 1 from the outside of the automobile through inlet openings 20. The air flow may be increased by an electrically-operated fan 24 of the type found in most conventional automobile venting systems which is operated from the battery and is controlled from within the cab of the automobile. The fan 24 serves to increase the air flow through the duct 16 and to create an air flow when the automobile is stationary and operates in conjunction with conventional heating or cooling systems.

The deodorizing elements are located within the engine compartment 26 under the hood, as shown in FIG. 1. These elements comprise a reservoir 28, containing a liquid deodorizer, and a pump 30. An atomizing nozzle 32 extends to directly outside the air duct 20, as shown in FIGS. 1 and 2. The pump 30 is operatively connected to the reservoir 28 by means of a tube 34 which extends from the pump and down into the reservoir 28. A second tube 36 connects the pump 30 to the atomizing nozzle 32. Pump 30 is electrically operated and is preferably connected to the storage battery of the vehicle.

The control means for operating the deodorizer of the present invention is shown schematically in FIG. 3. It is provided with a pair of power lines 38 and 40 connected to a source of electrical power 42. In the preferred embodiment, the source consists of the conventional automobile storage battery. The pump 30 is located on a line 44. A manually-operated switch 46 is also located on line 44 and is effective, when closed, to complete a circuit across line 44 to energize the pump 30. A switch 46 is located within the cab of the automobile, as shown in FIG. 2, and biased to the open position, so that it remains closed only as long as the switch 46 is manually depressed.

If desired, the control means for the deodorizer may also include automatic control elements consisting of a recycler 48 located on a line 50. The recycler 48 is effective, when energized, to open and close a contact 54 located on a line 56 which bypasses the switch 46. Closing of contact 54 is effective to energize the pump 30. A switch 52 located on line 50 is effective when closed to complete a circuit across line 50 and energize recycler 48. Switch 52 is also located within the cab of the automobile as shown in FIG. 2 and i preferably of the toggle or rocker type which remains in either the open or closed position Recycler 48 is of the type which, when energized, cycles repeatedly, so that its contact 54 is opened and closed alternately for predetermined periods of time Recycler 48 is also provided with means for adjusting the timing the open periods and the closed periods independently. Although there are many types of recyclers, a recycler sold by Electromatic Components Ltd., and identified as SC185/285 represents an example of a recycler which will function as described above.

The operation and advantages of the present invention will now be readily understood in view of the above description. During the operation of the vehicle, the deodorizer may be operated either in the manual mode or the automatic mode. If the operator of the vehicle experiences a temporary foul odor, the operator may depress the switch 46 to momentarily energize pump 30 and produce a spray of atomized deodorant just outside the inlet openings 20, as viewed n FIG. 2. The atomized deodorant is drawn into the cab of the vehicle along with air being drawn in from the outside through openings 20, with or without the assistance of fan 24.

If the operator of the motor vehicle anticipates that he or she will be driving through an area containing foul smelling odors for an extended period of time, he or she will close switch 52 to energize the recycler 48 and thereby place the deodorizer system in the automatic mode. Without requiring any further attention from the operator, the recycler 48 will be effective to alternately close and open contact 54 for predetermined periods, so that pump 30 is alternately energized and de-energized. This causes atomized deodorizing fluid to be periodically introduced into the duct 16. Switch 46 may, of course, be closed if desired whenever the automatic system is in the "off" period if an unexpected four-smelling situation arises. It is also preferred that one of the power lines, i.e., line 40, extends through the conventional ignition circuitry, identified by the reference numeral 50, so that none of the control elements for the deodorizer can be activated unless the conventional ignition switch, identified by the reference numeral 60, is closed.

Referring to FIG. 4, there is shown a modified control circuitry generally indicated by the reference numeral 61, comprising a pair of power lines 38, and 40' connected to a source of electrical power 42', such as the conventional automobile battery. As in the preferred embodiment, one of the power lines 40' extends through the conventional ignition circuitry 58' and is connected to the battery 42' upon closing of the conventional switch 60'. A recycler 48', located on line 50' is similar to recycler 48 described above and is effective, when energized, to alternately open and close contact 54' and 64 on lines 44' and 62, respectively. Closing of contacts 54' and 64 are effective to energize pump 30 and fan 24, respectively, located on lines 44' and 62, respectively. Recycler 48' is energized by a selector switch 66 which has a manual control position, an "off" position, and an automatic control position. Switch 66 will stay in the "off" position or the automatic control position, but will stay in the manual control position only as long as it is held in that position. One type of switch that may be used as a selector switch is a Leviton single pole, single throw toggle switch with two "on" contacts, one of which is momentary. The selector switch 66 may also comprise a tippette switch sold by Carling Switch, model TILC6E or TILC5F. When switch 66 is placed in the automatic control position, the switch element engages a contact 68 which completes a circuit across line 50' and energizes recycler 48'. Energization of recycler 48' causes contacts 54' and 64 to open and close in unison for predetermined time periods to energize pump 30 and fan 24 on lines 44' and 62, respectively. When the selector switch 66 is moved to the manual control position, the switch element engages a contact 70 on a line 72 which bypasses contact 64 and enables pump 30 to be energized when contact 54' is open.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to be secured by Letters Patent is:

1. Vehicle deodorizer system, comprising:
   (a) a venting system consisting of an air duct having an inlet opening to the outside of the vehicle and an outlet opening within the cab of the vehicle and means for creating air flow from the inlet opening to the outlet opening,
   (b) a reservoir for containing a deodorizing fluid,
   (c) an atomizing nozzle immediately outside the inlet opening of the air duct,
   (d) a supply tube operatively connecting the atomizer to the reservoir, and
   (e) means for pumping deodorizing fluid from the reservoir to the atomizing nozzle, wherein the pumping means comprises an electric pump operatively connected to the supply tube, a source of electrical power, and electrical control means for connecting the pump to the electrical power source, and wherein the electrical control means comprises an electrically operated recycler for alternately connecting and disconnecting the pump to the source of electric power for predetermined "ON" time periods and "OFF" time periods, respectively, and a manually-operated automatic control switch for connecting the recycler to the source of electric power.

2. Vehicle deodorizer system as recited in claim 1, wherein the recycler is manually adjustable for selectively altering the "ON" and "OFF" time periods.

3. Vehicle deodorizer system, comprising:
   (a) a venting system consisting of an air duct having an inlet opening to the outside of the vehicle and an outlet opening within the cab of the vehicle and means for creating air flow from the inlet opening to the outlet opening,
(b) a reservoir for containing a deodorizing fluid,
(c) a atomizing nozzle immediately outside the inlet opening of the air duct,
(d) a supply tube operatively connecting the atomizer to the reservoir, and
(e) means for pumping deodorizing fluid from the reservoir to the atomizing nozzle, wherein the pumping means comprises an electric pump operatively connected to the supply tube, a source of electrical power, and electrical control means for connecting the pump to the electrical power source, and wherein the control means comprises an electrically-operated recycler for alternately connecting and disconnecting the pump to the source of electric power for predetermined "ON" time periods and "OFF" time periods, respectively, and a manually-operated selector switch having an "off" position, a manual control position, and an automatic control position, the manual control position serving to connect the pump to the source of electric power, the automatic control position serving to connect the recycler to the source of electric power, and the "OFF" position serving to disconnect the pump and recycler from the source of electric power.

4. Vehicle deodorizer system as recited in claim 3, wherein the "OFF" position is located between the manual control position and the selector switch is biased toward the "OFF" position when it is in the manual control position, so that the selector switch remains in the manual control position only as long as it is manually held in the manual control position.

* * * * *